United States Patent
Lim et al.

(10) Patent No.: US 6,873,421 B2
(45) Date of Patent: Mar. 29, 2005

(54) METHOD AND APPARATUS FOR MEASURING THE THREE-DIMENSIONAL SHAPE OF AN OBJECT USING A MOIRE EQUIPMENT

(75) Inventors: Ssang-Gun Lim, Taejeon (KR); Seung-Woo Kim, Taejeon (KR); Sang-Yoon Lee, Taejeon (KR); Chang-Jin Chung, Seoul (KR); Yi-Bae Choi, Taejeon (KR); Young-Sik Cho, Taejeon (KR); Kyung-Keun Park, Taejeon (KR)

(73) Assignee: Intek Plus Co., Ltd. (KR)

( * ) Notice: Subject to any disclaimer, the term of this patent is extended or adjusted under 35 U.S.C. 154(b) by 261 days.

(21) Appl. No.: 10/181,679

(22) PCT Filed: Oct. 31, 2001

(86) PCT No.: PCT/KR01/01841

§ 371 (c)(1),
(2), (4) Date: Jul. 18, 2002

(87) PCT Pub. No.: WO02/43402

PCT Pub. Date: May 30, 2002

(65) Prior Publication Data

US 2003/0043387 A1 Mar. 6, 2003

(30) Foreign Application Priority Data

Nov. 22, 2000 (KR) .......................... 2000-69549

(51) Int. Cl.[7] .................................. G01B 11/24
(52) U.S. Cl. ......................................... 356/605
(58) Field of Search ................ 356/601–605, 356/630

(56) References Cited

U.S. PATENT DOCUMENTS

| | | | | |
|---|---|---|---|---|
| 5,636,025 A | * | 6/1997 | Bieman et al. | 356/619 |
| 5,668,631 A | * | 9/1997 | Norita et al. | 356/608 |
| 5,714,832 A | | 2/1998 | Shirrod et al. | |
| 5,847,832 A | | 12/1998 | Liskow et al. | |
| 6,075,605 A | * | 6/2000 | Futamura et al. | 356/608 |
| 6,731,391 B1 | * | 5/2004 | Kao et al. | 356/605 |

FOREIGN PATENT DOCUMENTS

| | | |
|---|---|---|
| KR | 2001-29190 | 4/2001 |

* cited by examiner

Primary Examiner—Zandra V. Smith
(74) Attorney, Agent, or Firm—Cantor Colburn LLP

(57) ABSTRACT

An apparatus and method for measuring a three-dimensional shape of an object using a projection moiré device. The method comprises the steps of obtaining a grid pattern image projected on a reference plane of a moving table and applying a buckets algorithm thereto, thereby achieving a reference phase, obtaining a grid pattern image projected on the object set on the moving table and applying a buckets algorithm thereto, thereby achieving an object phase, calculating a difference phase between the object phase and the reference phase, thereby achieving a moiré phase, and unwrapping the moiré phase, thereby achieving a level information of the object. The apparatus and method measure the three-dimensional shape using a projection grid without a reference grid, thereby achieving compactness of equipment, simplicity in usage and manufacturing cost reduction.

9 Claims, 17 Drawing Sheets

METHOD AND APPARATUS FOR MEASURING THE THREE-DIMENSIONAL SHAPE OF AN OBJECT USING A MOIRE EQUIPMENT

TECHNICAL FIELD

The present invention relates to a method and apparatus for measuring the three-dimensional shape of an object using a projection moiré device, and more particularly to a method and apparatus for measuring a three-dimensional shape using a projection moiré device, in which a measurement of the three-dimensional shape is made using a projection grid without a reference grid, thereby achieving compactness of equipment, simplicity in usage and manufacturing cost reduction.

BACKGROUND ART

As well known to those skilled in the art, a moiré device is commonly used to measure the three-dimensional shape of an object. As disclosed in Korean Patent Laid-open Publication No. 98-7797, a conventional phase-shifting projection moiré device measures a three-dimensional shape using a projection grid 513 and reference grid 512. Namely, by moving the projection grid 513 and reference grid 512, during a measurement, with their grid images being formed as shown in FIG. 1b using a semiconductor lithography technique on a quartz glass, various moiré images can be obtained so as to achieve an information about the three-dimensional shape from these images.

A conventional projection moiré device to which the above technique is applied will be described with reference to FIG. 1a. A beam of light from a white light source 510 is condensed through a condenser lens 516 and then projected to an object to be measured 515 through a projection grid 513 and projection lens 517, forming a grid image of line patterns on the object, which is deformed corresponding to the three-dimensional shape of the object, as shown in FIG. 1c. The deformed line pattern image is focused on an image pickup surface of a CCD camera 511 after being passed through an image formation lens 518, reference grid 512 and relay lens 519. An image obtained as a result is shown in FIG. 1d, wherein the resulting image is synthesized during time that the deformed line pattern image, that is a cast of the projection grid, is passed through the reference grid 512.

The resulting image is synthesized from the line pattern moiré image having the information of the three-dimensional shape of the object 515 and an image of the reference grid, wherein the reference grid image is a main cause of measurement error, whereby additional specific equipment is commonly used to remove the reference grid image from the synthesized image.

To measure a three-dimensional shape using the conventional moiré device, it is necessary to adjust a distance between line patterns of the line pattern image in accordance with measurement parameters such as the size of an object to be measured, topology, accuracy of measurement or the like, so the conventional device for measuring a three-dimensional shape needs various kinds of projection grids and reference grids. Thus, the conventional device is inconvenient in that the projection grid and reference grid have to be changed every time in accordance with an object to be measured, as well as having a high manufacturing cost.

The conventional device for measuring a three-dimensional shape must have an additional moving unit 514 to move the projection grid and reference grid a minute distance in order to obtain various moiré images, thereby having problems of enlarging a volume of equipment and increasing a manufacturing cost.

DISCLOSURE OF THE INVENTION

Therefore, the present invention has been made in view of the above problems, and it is an object of the present invention to provide a method and apparatus for measuring a three-dimensional shape using a projection moiré device, in which a measurement of the three-dimensional shape is made by using a projection grid without a reference grid, thereby achieving compactness of equipment, simplicity in usage and manufacturing cost reduction.

In accordance with one aspect of the present invention, the above and other objects can be accomplished by the provision of an apparatus for measuring a three-dimensional shape of an object using a projection moiré device, comprising a moving table moved by a driving motor, the moving table supporting the object; a projection grid projector for projecting a light beam from a light source onto the moving table through a projection grid, the projection grid being moved a minute distance by a driving PZT unit; a reflection mirror for changing a light path of a light beam projected from the projection grid projector for the light beam to be reflected onto the moving table, the reflection mirror being set in the light path between the projection grid projector and the moving table; an image obtaining unit for obtaining grid pattern images respectively projected on the object and a reference plane of the moving table, the image obtaining unit being positioned above the moving table; and a central control unit for achieving a level information of the object from the images obtained by the image obtaining unit.

In accordance with another aspect of the present invention, there is provided an apparatus for measuring a three-dimensional shape of an object using a projection moiré device, comprising a moving table moved by a driving motor, the moving table supporting the object; a laser generator including a rotating polygonal mirror with a plurality of reflecting facets to reflect a point light beam generated from a light source, a cylindrical lens for transforming the point light beam reflected by the rotating polygonal mirror to a parallel light beam and projecting a line pattern image on the moving table, a light receiving unit for detecting a light path reflected by the rotating polygonal mirror and thereby generating a synchronizing signal, and control means for controlling a blinking period of the light source and distances between line patterns to be adjusted in response to the synchronizing signal of the light receiving unit; an image obtaining unit for obtaining grid pattern images respectively projected on the object and a reference plane of the moving table, the image obtaining unit being positioned above the moving table; and a central control unit for achieving a level information of the object from the images obtained by the image obtaining unit.

Preferably, the central control unit may apply a buckets algorithm to the grid pattern images obtained through the image obtaining unit, thereby achieving an object phase of the object and a reference phase with respect to the reference plane, and subtract the object phase from the reference phase, thereby achieving a moiré phase.

Preferably, the central control unit may unwrap the moiré phase, thereby achieving an actual level information of the object.

Preferably, the control means of the laser generator may include a light receiving unit driver and a time control driver, the light receiving unit driver being coupled with the light receiving unit and outputting a signal notifying the time control driver of a termination of a light beam reflection by a reflecting facet of the rotating polygonal mirror, the time control driver controlling an on/off time of a light beam generated from the light source on the basis of the output signal from the light receiving unit.

In accordance with yet another aspect of the present invention, there is provided a method for measuring a three-dimensional shape of an object using a projection moiré device, comprising the steps of a) obtaining a grid pattern image projected on a reference plane of a moving table, and applying a buckets algorithm thereto, thereby achieving a reference phase; b) obtaining a grid pattern image projected on the object set on the moving table, and applying a buckets algorithm thereto, thereby achieving an object phase; c) calculating a difference phase between the object phase and the reference phase, thereby achieving a moiré phase; and d) unwrapping the moiré phase, thereby achieving a level information of the object.

Preferably, the grid pattern image may be obtained by projecting a light beam from a light source through a projection grid moved a minute distance.

Preferably, the grid pattern image may be obtained by reflecting a point light beam from a light source by a reflecting facet of a rotating polygonal mirror and transforming the reflected point light beam to a parallel light beam through a cylindrical lens.

BRIEF DESCRIPTION OF THE DRAWINGS

The above and other objects, features and other advantages of the present invention will be more clearly understood from the following detailed description taken in conjunction with the accompanying drawings, in which:

FIG. 1b is a view showing an image of a reference grid of FIG. 1a;

BEST MODE FOR CARRYING OUT THE INVENTION

Now, preferred embodiments of the present invention will be described in conjunction with the annexed drawings.

Figure 2:
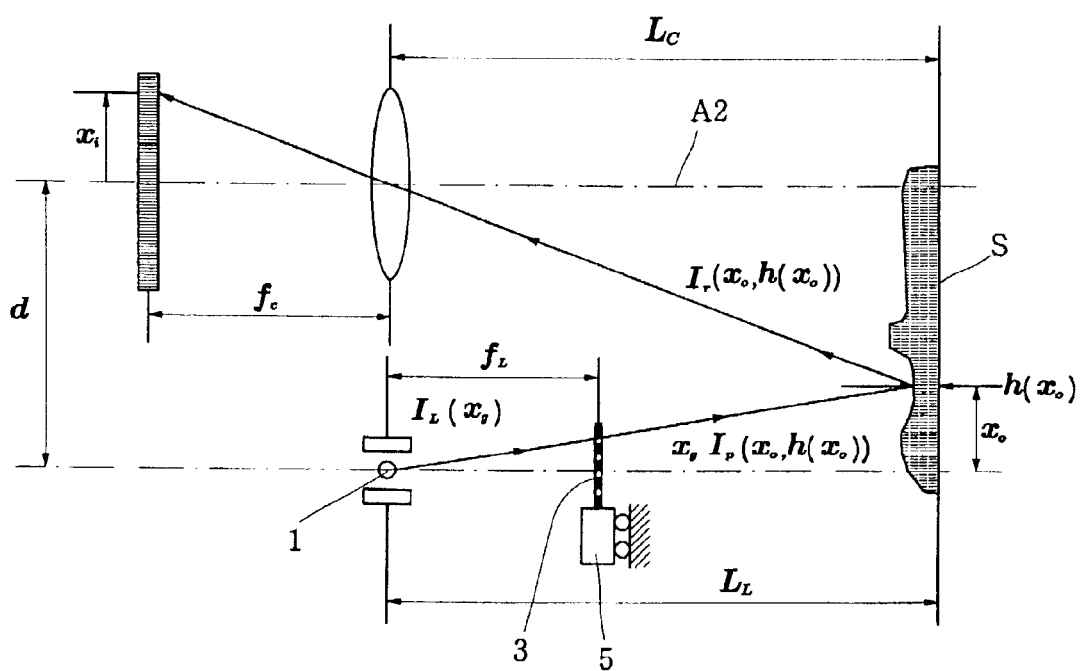
FIG. 2 is an embodiment of a projection moiré device, which is applied to the present invention.

FIG. 2 is a diagram showing an embodiment of a projection moiré device without a reference grid, which is applied to the present invention.

Referring to FIG. 2, "$f_L$" represents a distance between a light source 1 and a projection grid 3, and "$L_L$" represents a distance from the light source 1 to a reference surface S where an object to be measured is positioned. "$f_c$" represents a distance between an image plane of a light receiving unit 11, which includes a CCD camera, and an image formation lens 9 and "$L_c$" represents a distance between the image formation lens 9 and reference surface S where the object is positioned. "$x_i$" represents a distance from an optical axis to a given point on the image plane of the light receiving unit 11 and "$x_g$" represents a distance from the optical axis to a given point on the projection grid 3.

A light beam from the light source 1 incident to the point on the projection grid 3 spaced apart from the optical axis by "$x_g$", is projected onto a point $(x_0, h(x_0))$ on the object 7 after being passed through the projection grid 3. The light beam reflected by the object 7 arrives at a position spaced apart from the optical axis by "$x_i$" on the image plane of the light receiving unit 11 through a center of the image formation lens 9.

A transmittance $T(x_g)$ of the projection grid 3 is expressed by the following equation 1, where g represents a pitch of the grid.

$$T(x_g) = 1 + \cos\left(\frac{2\pi}{g}(x_g + \Delta)\right) \quad (1)$$

Here, "$\Delta$" is an initial position of the projection grid 3.

A brightness $I_p(x_0, h(x_0))$ of the light beam incident to the point $(x_0, h(x_0))$ on the object 7 after being passed through the projection grid 3, is expressed by the following equation 2, where $I_L(x_g)$ represents a brightness of the light beam incident to the point spaced apart from the optical axis by "$x_g$" on the projection grid 3:

$$I_P(x_0, h(x_0)) = I_L(x_g)T(x_g) = I_L(x_g)\left[1 + \frac{\cos 2\pi}{g}(x_g + \Delta)\right] \quad (2)$$

A geometric relationship between factors of the equation 2 is expressed by the following equation 3:

$$\frac{x_i}{f_c} = \frac{d - x_0}{L_L - h(x_0)}, \text{ or } x_0 = d - \frac{x_i}{f_c}(L_c - h(x_0)) \quad (3)$$

$$\frac{x_g}{f_L} = \frac{x_0}{L_L - h(x_0)}.$$

Therefore, the point spaced apart from the optical axis by "$x_g$" on the projection grid 3 can be expressed by the following equation 4:

$$x_g = f_L \frac{x_0}{L_L - h(x_0)} \quad (4)$$

The brightness $I_P(x_0, h(x_0))$ of the light beam incident to the object 7 through the projection grid 3 can be expressed by the following equation 5:

$$I_P(x_0, h(x_0)) = I_L(x_g)\left[1 + \cos\left(\frac{2\pi}{g}\left(\frac{f_L x_0}{L_L - h(x_0)} + \Delta\right)\right)\right] \quad (5)$$

A brightness $I(x_i)$ of the light beam incident to the point spaced apart from the optical axis by "$x_i$" on the image plane of the light receiving unit 11 can be expressed by the following equation 6, where R $(x_0, h(x_0))$ represents a reflectivity at the point $(x_0, h(x_0))$ on the object 7:

$$I(x_i) = R(x_0, h(x_0))I_P(x_0, h(x_0)) \quad (6)$$

The following equation 7 can be obtained by using a geometric relationship between factors of the equation 6:

$$\frac{x_i}{f_c} = \frac{d - x_0}{L_c - h(x_0)} \rightarrow x_0 = d - \frac{x_i}{f_C}(L_c - h(x_0)) \quad (7)$$

Hence, the brightness $I(x_i)$ of the light beam incident to the point spaced apart from the optical axis by "$x_i$" on the image plane of the light receiving unit 11 can be expressed by the following equation 8:

$$I(x_i) = A_i\left[1 + \cos\left(\frac{2\pi}{g}\left(\frac{f_L}{L_L - h_i}\left(d - \frac{x_i}{f_c}(L_c - h_i)\right) + \Delta\right)\right)\right] \quad (8)$$

$$= A_i\left[1 + \cos\left(\frac{2\pi}{g}\left(\frac{f_L d}{L_L - h_i} - \frac{f_L}{f_c}\frac{L_c - h_i}{L_L - h_i}x_i + \Delta\right)\right)\right],$$

where, $A_i = R(x_0, h(x_0))I_L(x_g)$, $h_i = h(x_0)$

Here, the equation 8 can be expressed to the following equation 9, when $L_L = L_c = L$ and $f_L = f_c = f$:

$$I(x_i) = A_i\left[1 + \cos\left(\frac{2\pi}{g}\left(\frac{fd}{L - h_i} - x_i + \Delta\right)\right)\right] \quad (9)$$

$$\frac{fd}{L - h_i} - x_i = \frac{fd}{L - h_i} - \frac{fd}{L} + \frac{fd}{L} - x_i = \frac{fd/L}{L - h_i}h_i + \left(\frac{fd}{L} - x_i\right)$$

Let $fd/L - x_i = x'_i$ here, then:

$$I(x_i) = A_i\left[1 + \cos\left(\frac{2\pi}{g}\left(\frac{\frac{fd}{L}h_i}{L - h_i} + x'_i + \Delta\right)\right)\right] \quad (10)$$

A grid image of the projection grid, which is deformed with respect to the three-dimensional shape of the object 7, can be expressed by the equation 10.

As shown in the equation 10, it is noted that the deformed grid image includes a level information $h_i$ of the object 7.

In the conventional moiré technique, a moiré phase $\phi_{im}$ related only to the level information of the object expressed by the following equation 11, is obtained by setting the reference grid in front of the light receiving unit:

$$\phi_{im} = \frac{2\pi}{g}\frac{\frac{fd}{L}h_i}{L - h_i} \quad (11)$$

However, in the moiré device without a reference grid 3, which is applied to the present invention, a moiré image can be obtained by using only the deformed grid image through the following steps.

A brightness $I_{ij}$ of the deformed grid image, where $\Delta = \Delta_j$, can be generally expressed by the following equation 12, when there is an external illuminator besides the light source 1:

$$(I_{ij} \equiv I(x_i)|)_{\Delta = \Delta_j} = M_i + N_i\cos\left(\Psi_i + \frac{2\pi}{g}\Delta_j\right) \quad (12)$$

where, $\Psi_i = \frac{2\pi}{g}\left(\frac{d/m}{L - h_i}h_i + x'_i\right)$, $m \equiv \frac{L}{f}$ Where $M_i$ corresponds to a brightness of a background, and $N_i$ to a contrast of the deformed grid image.

"$\psi_i$" having a shape information can be expressed by the following equation 13 in terms of a measurable phase $\overline{\Psi}_i$ ($-\pi < \overline{\Psi}_i \leq 2\pi n$) and an integer n:

$$\Psi_i = \frac{2\pi}{g}\left(\frac{d/m}{L - h_i}h_i + x'_i\right) = \overline{\Psi}_i + 2\pi n \quad (13)$$

Here, a reference phase $$\Psi_{ir} \equiv \Psi_i|_{h_i=0} = 2\pi\frac{x'_i}{g}$$

can be obtained by using an image on the reference surface when $h_i=0$, and a phase of the object at the level $h_i$, that is a moiré phase $\psi_{i0}$, can be obtained when the object is set on the reference surface.

A moiré phase $\psi_{im}$, which is defined as a phase difference between two phases, the reference phase and object phase, corresponds to the moiré phase $\phi_{im}$ of the above equation 11 and can be expressed by the following equation 14:

$$\Psi_{im} \equiv \Psi_{i0} - \Psi_{ir} = \frac{2\pi}{g}\frac{(d/m)h_i}{L - h_i} = \frac{2\pi}{g}\frac{\frac{fd}{L}h_i}{L - h_i} = \phi_{im} \quad (14)$$

As a result, it can be understood that the moiré image (moiré phase) can be obtained without using the reference grid 3.

A description of a process for measuring a plaster figure of lips-shape using the above equations will be given hereinafter.

Figure 3A:
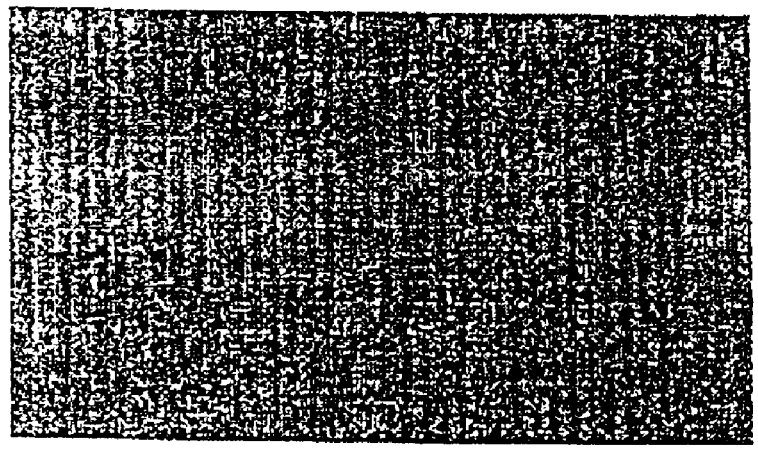
FIG. 3a is an image obtained by projecting a projection grid of FIG. 2 onto a reference plane.
Figure 3B:
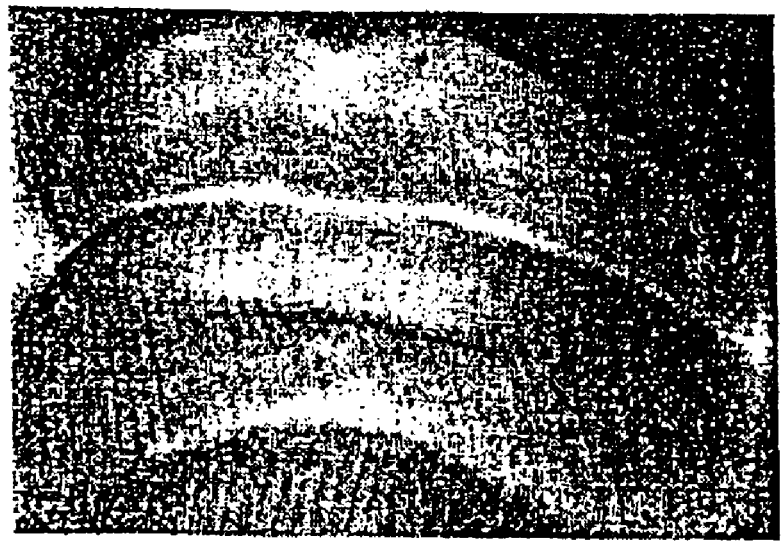
FIG. 3b is an image obtained by projecting the projection grid of FIG. 2 onto a plaster figure.

FIG. 3a is an image of the projection grid projected on the reference plane S, which is captured by the light receiving unit 11, and FIG. 3b is an image of the projection grid 3 projected on the lips-shaped plaster figure, that is the object to be measured.

Phases of the images in FIGS. 3a and 3b, respectively, can be calculated by using a 4-buckets algorithm such as the following equation 15:

$$\Psi_i = \tan^{-1}\left(\frac{I_{i1} - I_{i3}}{I_{i0} - I_{i2}}\right) \quad (15)$$

$$\text{where, } \Delta_j = 0, \frac{g}{4}, \frac{g}{2}, \frac{3g}{4}$$

Figure 4A:
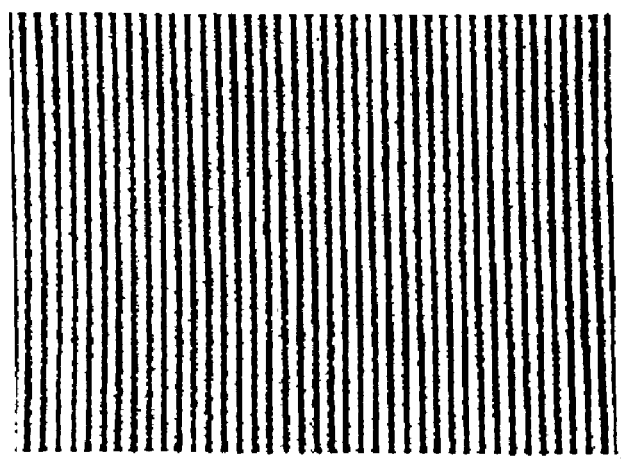
FIG. 4a is a line pattern image obtained by projecting the projection grid of FIG. 2 onto the reference plane.
Figure 4B:
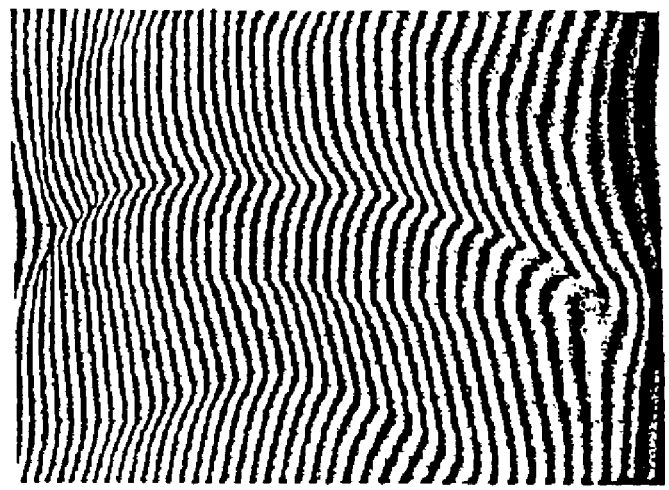
FIG. 4b is a line pattern image obtained by projecting the projection grid of FIG. 2 onto the plaster figure.
Figure 4C:
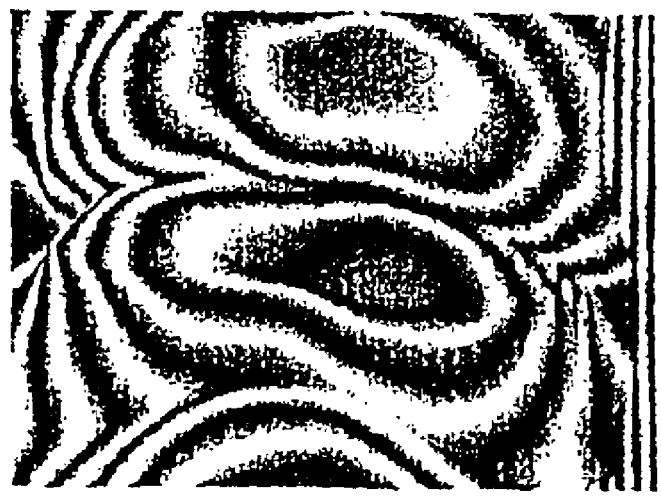
FIG. 4c is a moiré image obtained from images of FIGS. 4a and 4b.

FIG. 4a shows a phase $\overline{\Psi}_{ir}$ of the reference plane S and FIG. 4b shows a phase $\overline{\Psi}_{iO}$ of the object 7. FIG. 4c shows a moiré image (moiré phase) $\overline{\Psi}_{im}(=\overline{\Psi}_{iO}-\overline{\Psi}_{ir})$ calculated as a difference between the phase of the reference plane S and the phase of the object 7.

Figure 1A:
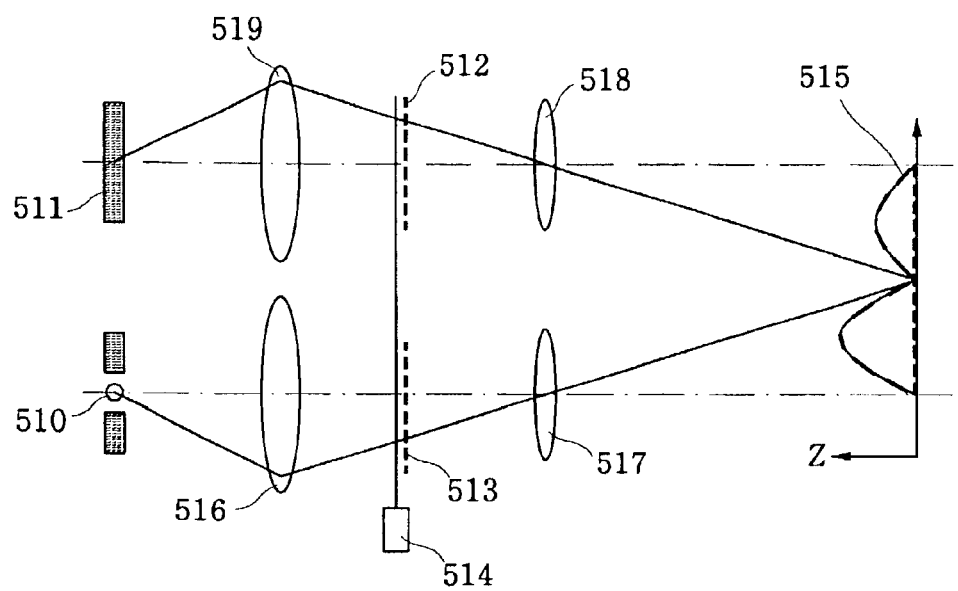
FIG. 1a is a schematic diagram showing the construction of a conventional projection moiré device.
Figure 1B:
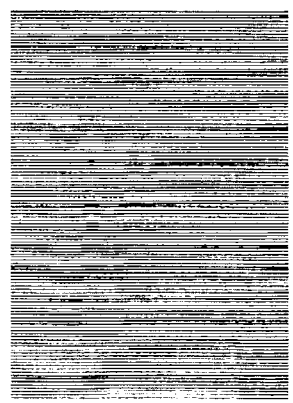
Figure 1C:
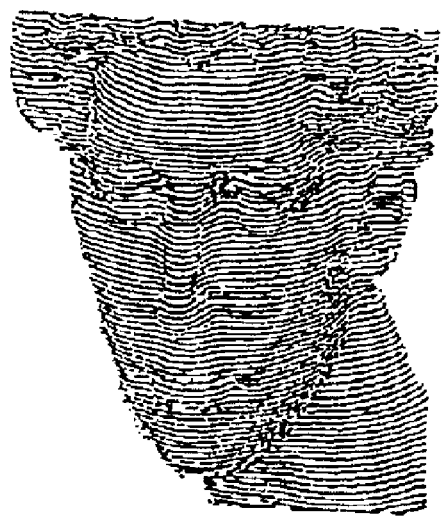
FIG. 1c is a view showing a deformed line pattern image obtained by projecting a projection grid of FIG. 1a to an object to be measured.
Figure 1D:
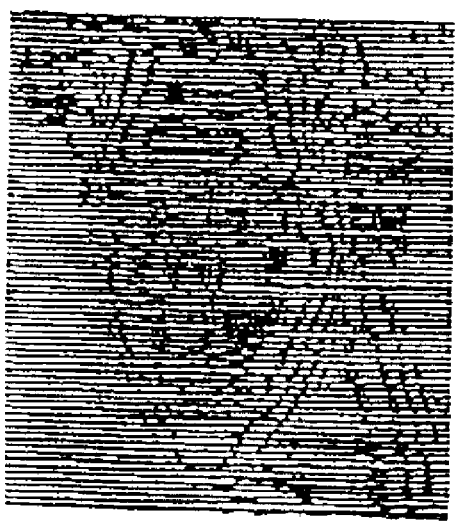
FIG. 1d is a view showing a moiré image synthesized from the reference grid image and the line pattern image of FIG. 1c.

As shown in FIG. 4c, it can be seen that only the image of the object 7 in the form of contour lines obtained at different levels (levels from the reference plane S) is shown in the moiré image obtained by the moiré device, which is applied to the present invention, but the reference grid image (see FIG. 1d) obtained by the conventional method is not shown therein. Thus, only the image of the object 7 measured at levels can be derived without the need for an additional removing means to remove the reference grid image.

Figure 5:
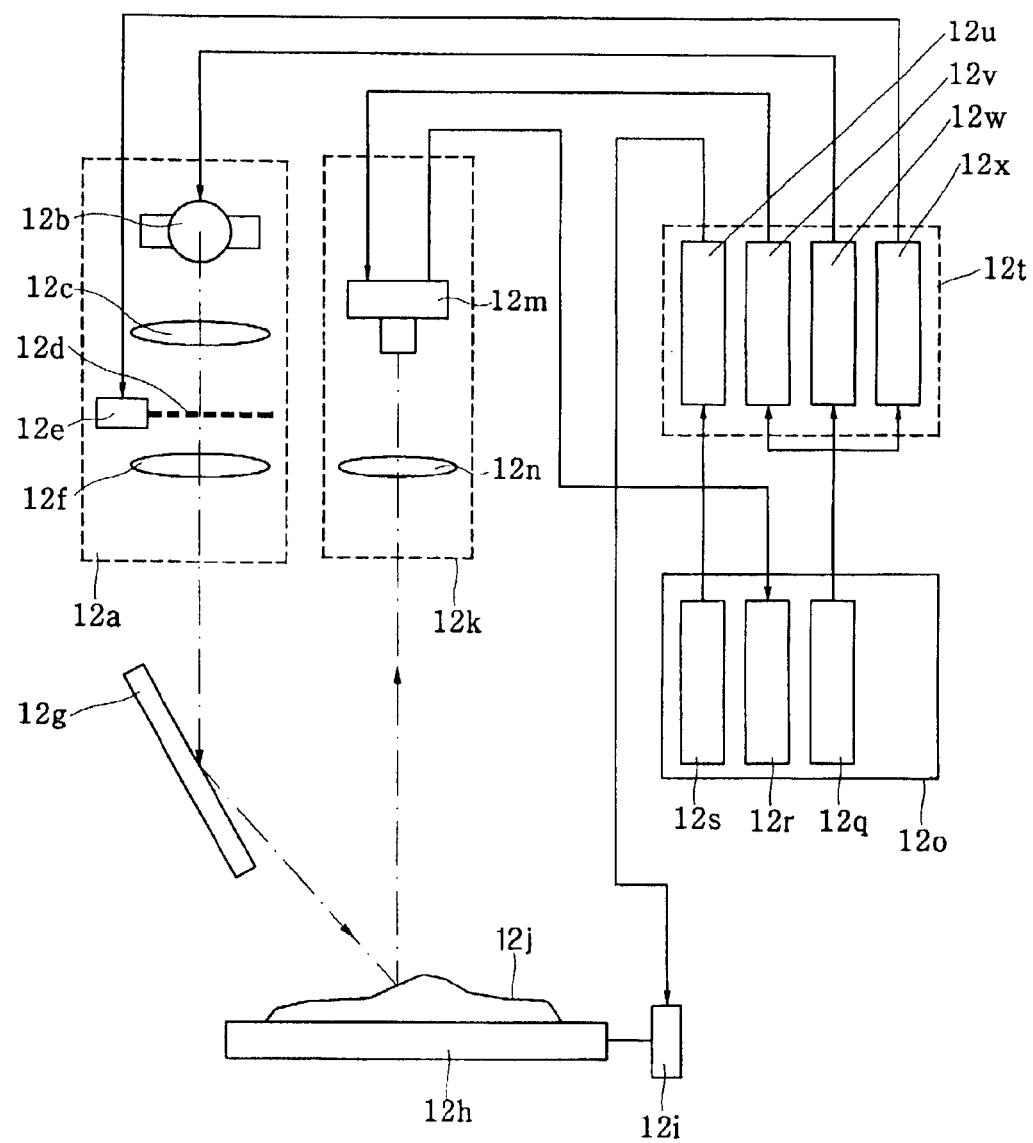
FIG. 5 is a schematic diagram of an apparatus for measuring a three-dimensional shape in accordance with the present invention, to which the moiré device of FIG. 2 is applied.

A description of an apparatus for measuring a three-dimensional shape in accordance with the present invention, using the projection moiré device capable of obtaining a moiré image without using a reference grid, as shown in FIG. 2, will be described hereinafter. FIG. 5 is a diagram showing the apparatus for measuring a three-dimensional shape in accordance with the present invention, to which the moiré device of FIG. 2 is applied.

As shown in FIG. 5, the apparatus of the present invention comprises a moving table moved by a driving motor 12i, which supports an object to be measured, image obtaining unit 12k and projection grid projector 12a for projecting a light beam generated from a light source 12b and condensed by a condenser lens 12c, and then passed through a projection grid 12d and projection lens 12f. The image obtaining unit 12k is positioned above the moving table 12h and the projection grid projector 12a is positioned on a side of the image obtaining unit 12k. The image obtaining unit 12k includes an image lens 12n and CCD camera 12m.

The apparatus of the present invention further comprises a reflection mirror 12g for reflecting a path of a light beam projected from the projection gird projector 12a so as to reflect the light beam toward the object 12j on the moving table 12h, wherein the reflection mirror is positioned on the light path lying between the projection grid projector 12a and moving table 12h. The projection grid 12d is set to be moved a minute distance by a driving PZT unit 12e.

The apparatus of the present invention further comprises a control module 12t for controlling each component of the apparatus to measure a three-dimensional shape. The control module 12t includes a motor driver 12u for driving a motor 12i to move the moving table 12h, a camera power supply 12v for supplying power to drive the CCD camera 12m, an illuminator power supply 12w for supplying power to drive the light source 12b, and a PZT driver 12x for driving the PZT unit 12e to move the projection grid 12d a minute distance. The control module 12t having the above construction drives each component with response to a control signal from a central controller 12o.

The central controller 12o includes an interface board 12q for interfacing with the camera power supply 12v, illuminator power supply 12w and PZT driver 12x of the control module 12t, a motor control board 12s for controlling the motor driver 12u to drive the motor 12i and an image board for obtaining an image being picked up by the CCD camera 12m, wherein the driving motor 12i moves the moving table 12h as described above.

The object 12j is set on the moving table 12h as described above and the moving table 12h is moved by the driving motor 12i to be aligned with the image obtaining unit 12k. The light source 12b, which usually includes a halogen lamp, may be set near the projection grid 12d or set separately to irradiate the projection grid 12d through an optical fiber.

Figure 15:
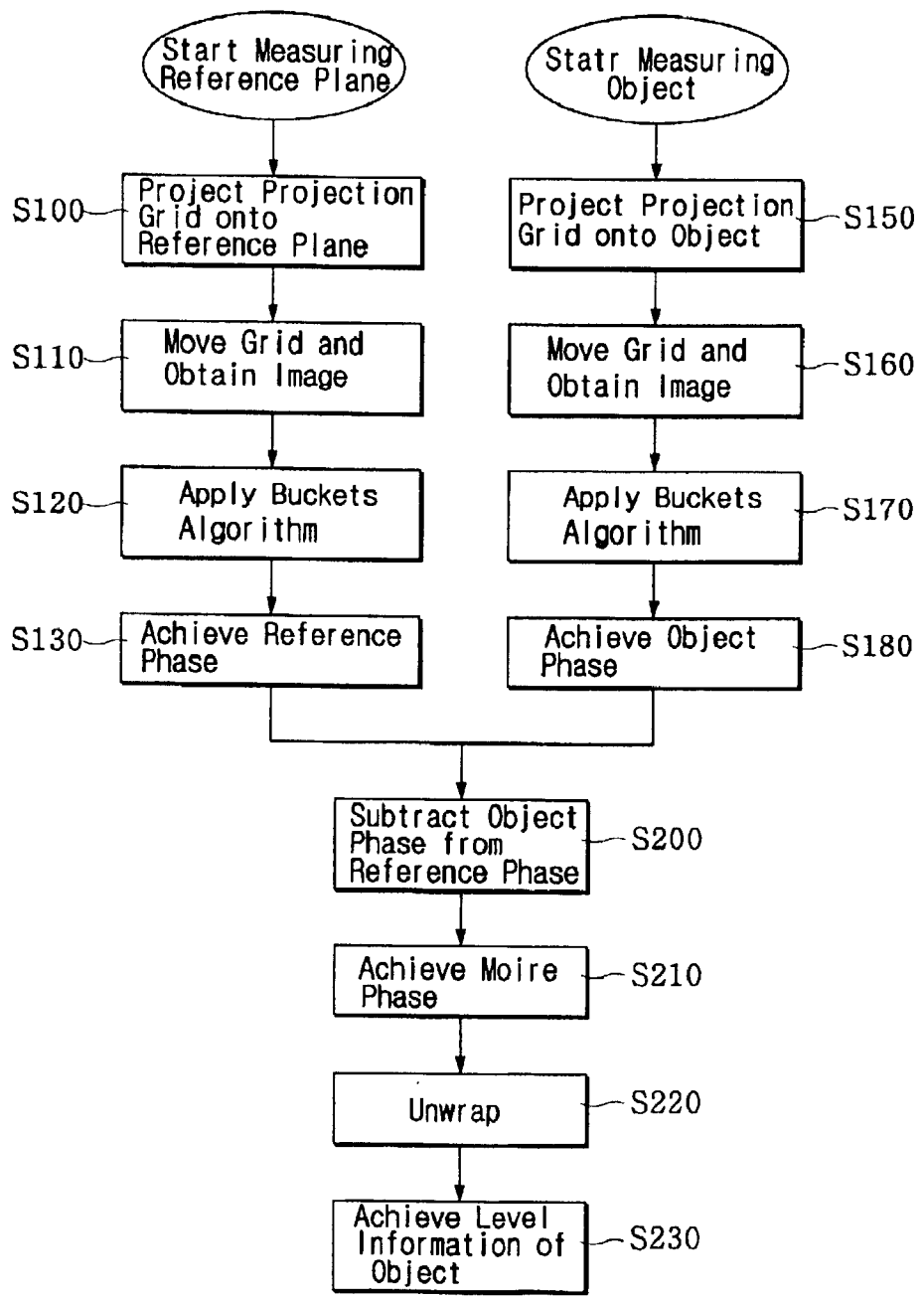
FIG. 15 is a flow chart illustrating a method for measuring a three-dimensional shape in accordance with the present invention.

A process for measuring the shape of an object to be measured using the three-dimensional shape measurement apparatus having the above described structure will be described hereinafter with reference to FIG. 15.

First, a light beam generated from the light source 12b is projected onto a reference plane of the moving table 12h through the projection grid 12d and projection lens 12f, in order to achieve a reference phase with respect to the reference plane (S100). While the light beam is projected onto the reference plane, the projection grid is moved a minute distance by the driving PZT unit 12e so as to make the 4-buckets algorithm (see the equation 15) applicable to an image projected thereonto, and the projected image is obtained by the CCD camera 12m and image board 12r (S110). Then, the 4-buckets algorithm is applied to the obtained image of the grid pattern (S120), whereby the reference phase with respect to the reference plane can be obtained (S130).

A process for obtaining an object phase with respect to an object to be measured will be described hereinafter. The object 12j is set on the moving table 12h and a light beam generated from the light source 12b is projected onto the surface of the object 12j through the projection grid 12d and projection lens 12f (S150). While the light beam is projected onto the surface of the object 12j, the projection grid 12d is moved a minute distance by the driving PZT unit 12e so as to make the 4-buckets algorithm (see the equation 15) applicable to an image projected thereonto, and the projected image is obtained by the CCD camera 12m and image board 12r (S160). Then, the buckets algorithm is applied to the obtained image with the grid pattern (S170), whereby the object phase with respect to the object 12j is obtained (S180).

By subtracting the object phase from the reference phase obtained as above (S200), a moiré phase can be obtained (S210) and by unwrapping the moiré phase (S220), actual level information of the object 12j can be obtained (S230). Respective steps of the process shown in FIG. 15 may be processed by a software installed on the central controller 12o, but may also be implemented by a hardware thereof.

A brief description of the three-dimensional shape measurement apparatus in accordance with the present invention will be given hereinafter, in which the present apparatus utilizes the projection moiré device obtaining a moiré image without using a reference grid as described above.

I. The grid image is projected onto the reference plane S of the moving table 12h, on which the object 12j is not set, through the projection grid 12d, and the projected grid image is obtained by the CCD camera 12m so that the 4-buckets algorithm (see the equation 15) may be applied thereto so as to calculate the reference phase, and then the calculated phase is stored at a memory.

II. The grid image is projected onto the object 12j set on the reference plane of the moving table 12h through the projection grid 12d, and the grid image deformed corresponding to the shape of the object 12j is obtained by the CCD camera 12m so that the 4-buckets algorithm may be applied thereto in order to calculate the object phase, and then the calculated phase is stored at the memory.

III. The moiré phase is calculated from the above reference phase and object phase.

IV. The moiré phase is unwrapped to achieve the level information of the object.

Figure 6:
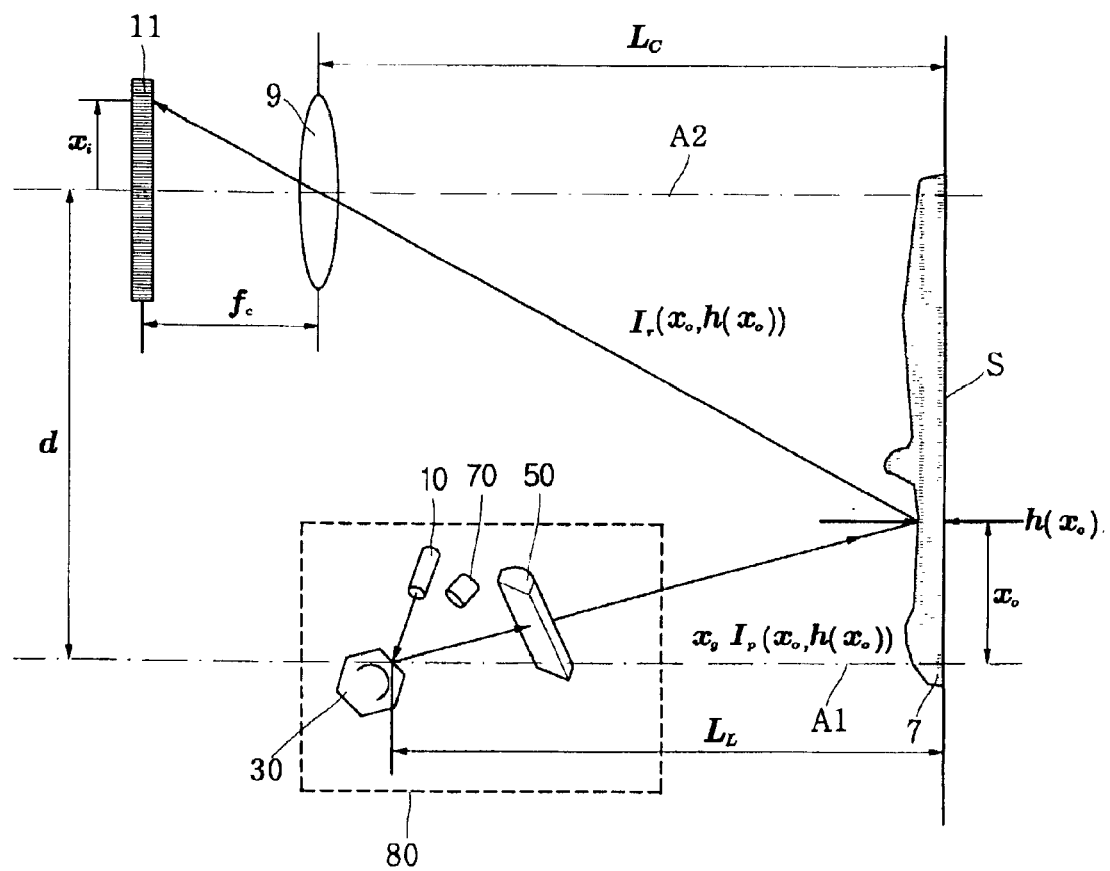
FIG. 6 is another embodiment of a projection moiré device, which is applied to the present invention.

A description of a projection moiré device for forming a grid image using a laser generator instead of the projection grid of the above embodiment will be given hereinafter. FIG. 6 is a diagram showing another embodiment of a projection moiré device, which is applied to the present invention, and FIG. 7 is an enlarged diagram of the laser generator of FIG. 6.

Figure 7:
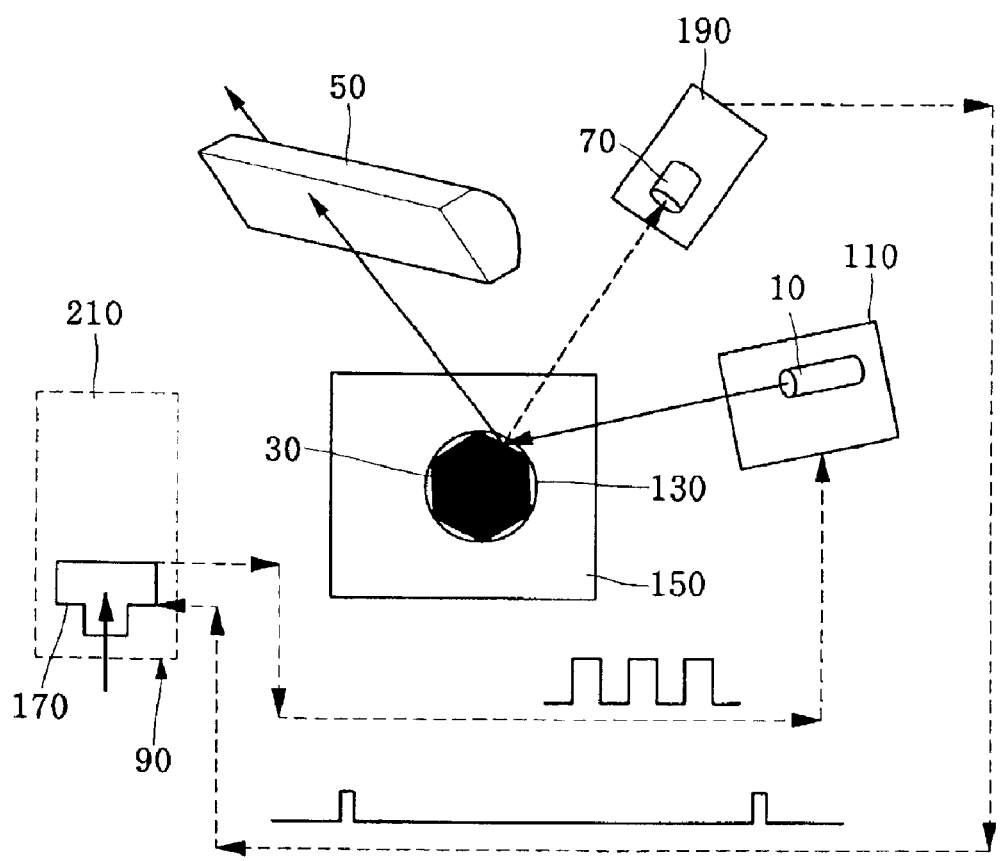
FIG. 7 is an enlarged diagram showing a laser generator of FIG. 6.

As shown in FIGS. 6 and 7, the laser generator includes a rotating polygonal mirror 30 having a plurality of reflecting facets for reflecting a point light beam generated from a light source 10, a cylindrical lens 50 for transforming the point light beam reflected by the rotating polygonal mirror 30 to a parallel light beam so as to form a line pattern image, a light receiving unit 70 for detecting a light path, of which a light beam is reflected by the rotating polygonal mirror 30, and generating a synchronizing signal, and a controller 90 for controlling a blinking period of the light source 10 and distance between line patterns to be adjusted in response to the synchronizing signal from the light receiving unit 70.

The light source 10 preferably includes a laser diode of a compact size, light in weight and low in cost. The laser diode, that is a semiconductor element, has an increased optical power as a temperature increases while having a decreased optical power as the temperature decreases. The light source 10 preferably has a light source driver 110 for monitoring driving current and a variation in laser power according to a temperature change and thereby controlling the light source 10 to maintain a stable laser power.

The light source driver 110 includes an inversion-amp and buffer, which light source driver maintains the stable laser power as described above. The light source driver 110 having the above construction maintains a constant intensity of a laser light beam under control of the controller 90, wherein its detailed description will be omitted here, as it is a commonly known technique.

A condenser lens (not shown) is integrally coupled to the point light irradiating portion of the light source 10. The condenser lens serves to condense the point light having dispersion characteristics, and to direct the condensed light beam towards the rotating polygonal mirror 30. The rotating polygonal mirror 30 is coupled with a spindle motor 130 rotating at a constant speed. The spindle motor 130 is coupled with a motor driver 150 including a power supply for supplying power stably.

A light receiving unit 70, a detector, is provided to detect a last one of effective light paths, which are used to form line patterns, among a number of light paths being formed when a reflecting facet of the rotating polygonal mirror 30 reflects the point light beam from the light source 10. To this end, the light receiving unit 70 includes a photo diode.

The controller 90 includes a computer 210 having a time control driver 170 controlling an on/off time of a light beam outputted from the light source 10, and a light receiving unit driver 190 coupled with the light receiving unit 70, which the light receiving unit driver 190 outputs a signal notifying the time control driver 170 of which a reflection of a light beam by a reflecting facet of the rotating polygonal mirror 30 has stopped, wherein the controller 90 controls the blinking period of the light source 10 and distance between line patterns to be adjusted as described above.

The light receiving unit driver 190 generates a synchronizing signal on the basis of a detection signal outputted from the light receiving unit 70, to output the generated signal to the time control driver 170. As shown in FIG. 7, the detection signal from the light receiving unit 70 is transferred to the time control unit driver 170 along a dotted line, and the generated synchronized signal on the basis of the transferred detection signal is transferred to the light source driver 110 to control the light source 10. The time control driver 170 is equipped in the computer 210, which generates a blink signal to output the generated signal to the light source driver 110, under a drive of an exclusive software program stored at the computer.

A detailed description of a process to obtain a moiré image through the projection moiré device using the laser generator having the structure as described above will be given hereinafter.

A point light beam generated from the light source 10 is irradiated onto a reflecting facet of the rotating polygonal mirror 30, which rotates at a high speed, and then the point light beam reflected by the reflecting facet of the rotating polygonal mirror 30 is transformed to a parallel light beam as it passes through the cylindrical lens 50. By blinking the light source 10 at a predetermined blinking period, a line pattern image with a predetermined distance between line patterns is obtained through a parallel light beam irradiated onto the three-dimensional shape of an object to be measured through the cylindrical lens 50.

Figure 8A:
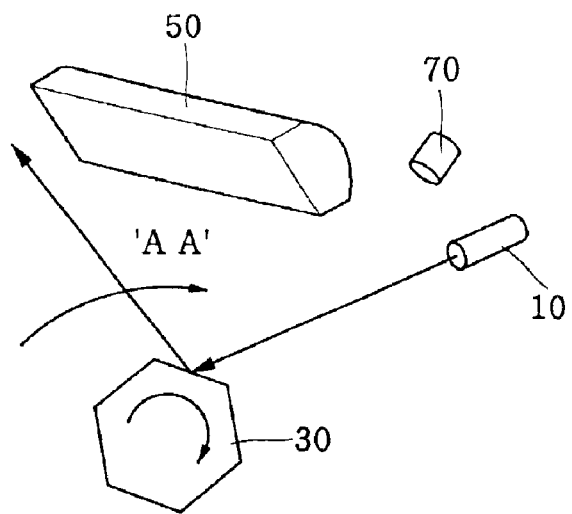
FIGS. 8a to 8c are diagrams showing movement paths of laser beams according to rotations of a rotating polygonal mirror of FIG. 7.
Figure 8B:
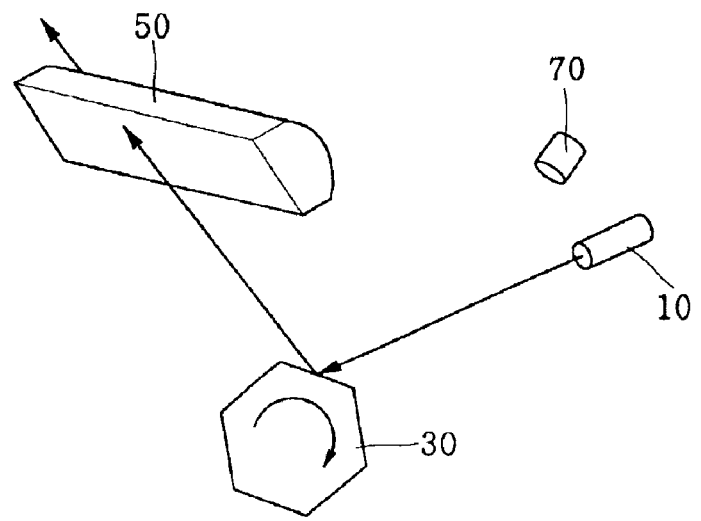
Figure 8C:
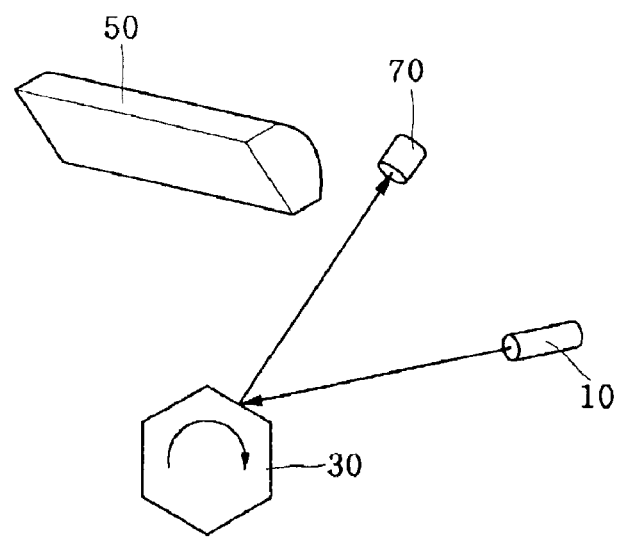

A light beam irradiated from the light source 10 is transferred and reflected along a light path of an arrow shown in each of FIGS. 8a to 8c in the direction of 'AA'. If an incident angle of a light beam incident on a reflecting facet of the rotating polygonal mirror 30 is wider, then a reflected light beam deviates to the left of the cylindrical polygonal mirror 50 as shown in FIG. 8a.

However, if the incident angle of a light beam incident on a reflecting facet of the rotating polygonal mirror 30 becomes narrower as shown in FIG. 8b, then a reflected light beam, which is a point light beam, passes through the cylindrical polygonal mirror 50 so that the point light beam is transformed to a parallel light beam to be irradiated on the desired three-dimensional shape of the object.

As shown in FIG. 8c, if the incident angle of a light beam incident on a reflecting facet of the rotating polygonal mirror 30 become much narrower, then a reflected light beam deviates to the right of the cylindrical polygonal mirror 50, and when the reflected light beam deviating to the right of the cylindrical polygonal mirror 50 is incident on the light receiving unit 70, which is positioned at the last one of the effective light paths, the light receiving unit driver 190 generates a synchronizing signal synchronized with a reflected light beam along the last light path detected by the light receiving unit 50.

Figure 9:
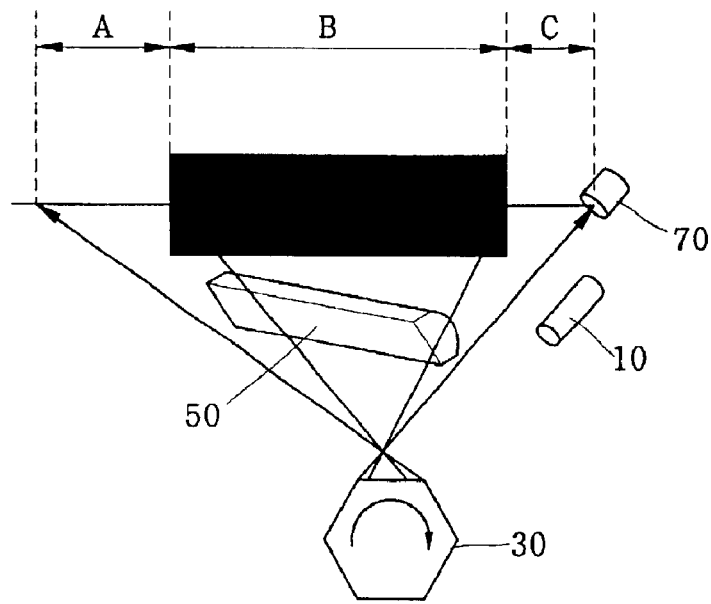
FIG. 9 is a diagram showing a form of a laser beam generated by a laser generator of FIG. 6.

As a result, the point light beam reflected by a reflecting facet of the rotating polygonal mirror 30 assumes a planiform shape to measure the desired three-dimensional shape, as shown in FIG. 9.

In other words, the light beam reflected with the reflection angle, which varies as the rotating polygonal mirror 30 rotates at a high speed, is passed through the cylindrical lens 50 so that the reflected light beam is transformed to a continuous parallel light beam to form a thick rectangle B. On the other hand, the light beam not passed through the cylindrical lens 50 is directly projected as the point light beam to form a thin line A or c.

Figure 10:
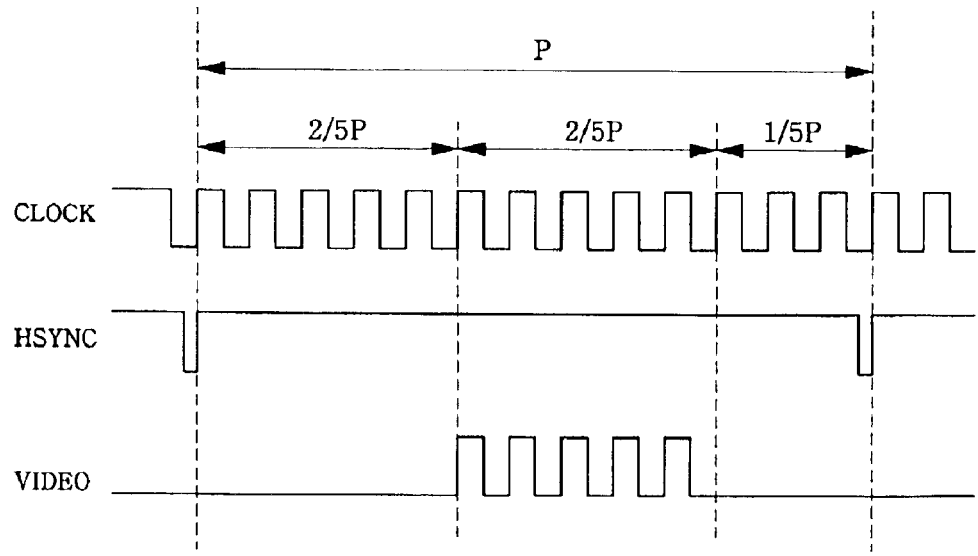
FIG. 10 is an example of a timing signal for controlling the laser generator of FIG. 6.
Figure 11:
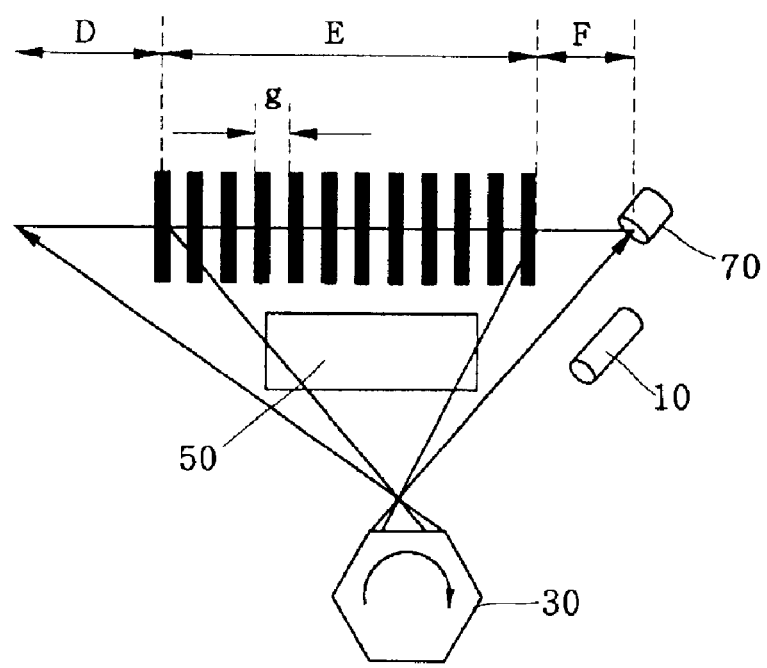
FIG. 11 is a diagram showing a form of a laser beam generated by the laser generator in accordance with the timing signal of FIG. 10.

By adjusting the blinking period of the light source 10 on the basis of the timing diagram shown in FIG. 10 using the above principle, a line pattern region E or line region D or E can be obtained as shown in FIG. 11.

The time control driver 170 generates a drive signal VIDEO to blink the light source 10 with respect to a cluck signal CLUCK, which is a reference signal applied thereto by the computer 210, during one period of a synchronizing signal HSYNC outputted from the light receiving unit driver 190, where an interval for which the effective planiform is formed by a reflecting facet of the rotating polygonal mirror 30 during one period of a synchronizing signal HSYNC, that is the interval corresponding to the line pattern region E, is limited to ⅖ of the period (⅖P) thereof.

The light receiving unit driver 190 outputs a synchronizing signal of a TTL (transistor transistor logic) high level of DC 4.2V or more, during an interval for which a reflected light beam is not received by the light receiving unit 70, but when a reflected light beam is received by the light receiving unit 70, the light receiving unit driver 190 outputs a pulse of a TTL low level of DC 0.8V or less.

The light source 10 is turned off at a TTL high level of the blinking drive signal VIDEO outputted by the time control driver 170 and turned on at a TTL low level thereof.

By adjusting the blinking period of the light source 10 on the basis of the timing diagram, the line pattern region E, which is a collection of a number of line patterns of parallel light beams, is obtained, where the distance, g, between the line patterns of the parallel light beams can be increased or decreased as the time control driver 170 is controlled to vary the blinking period of the blinking drive signal VIDEO.

Figure 12:
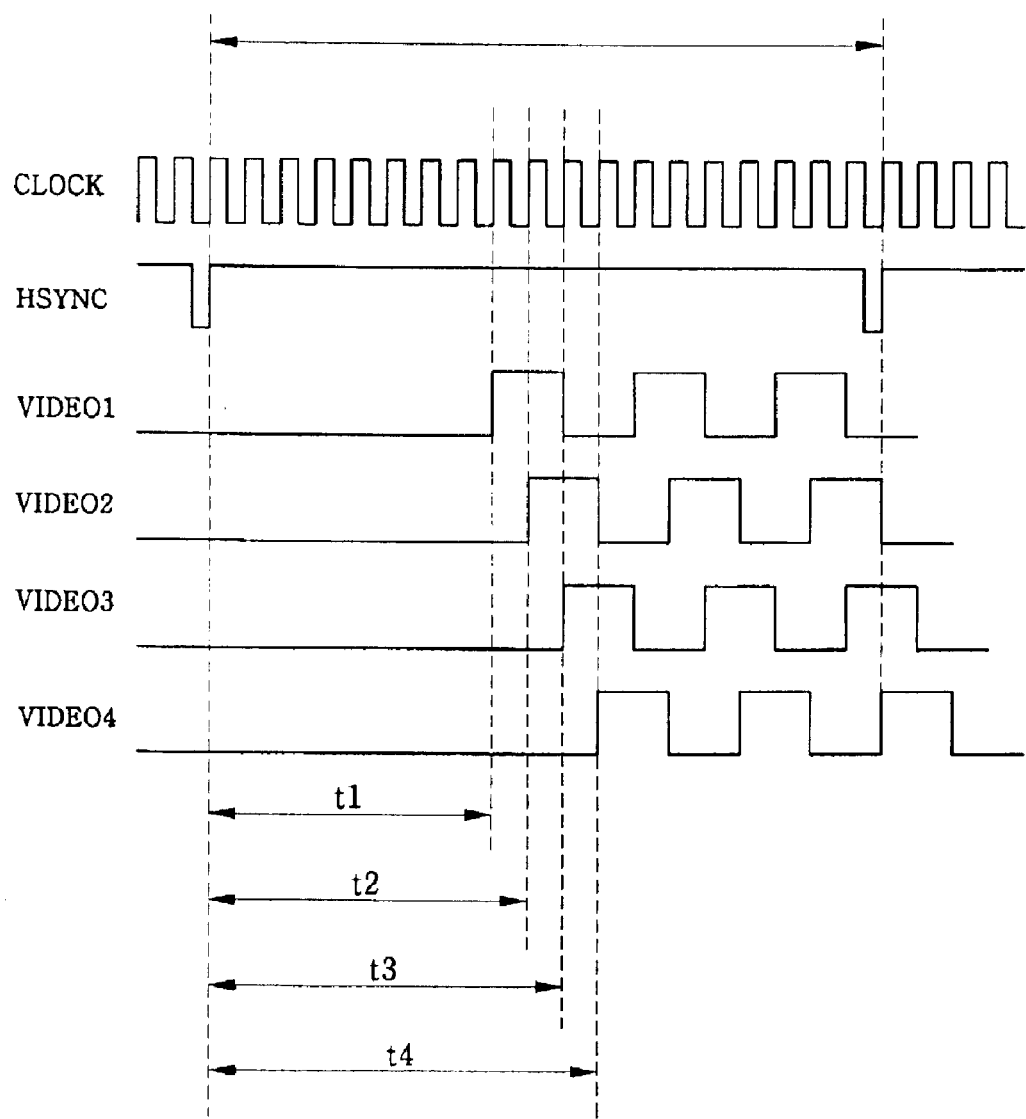
FIG. 12 is another example of a timing signal for controlling the laser generator of FIG. 6.
Figure 13:
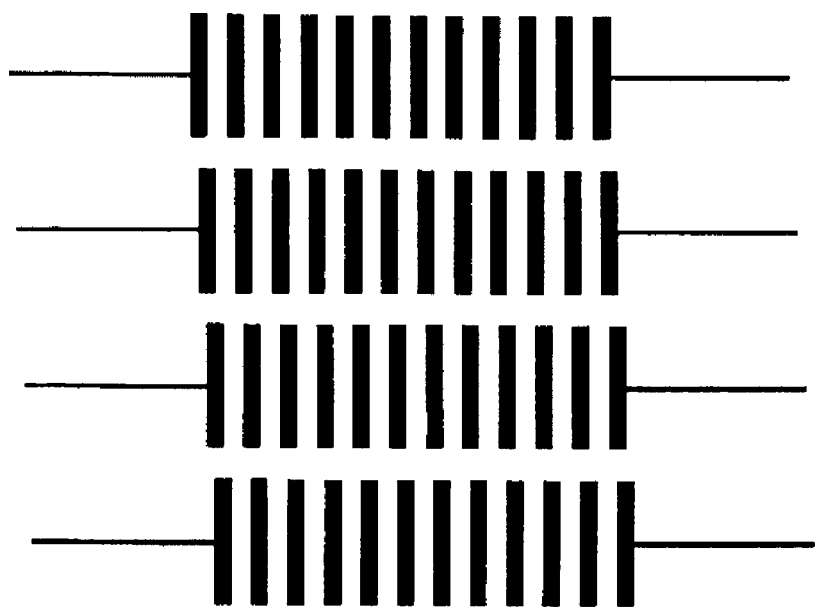
FIG. 13 is a diagram showing a form of a laser beam generated by the laser generator in accordance with the timing signal of FIG. 12.

The time control driver 170 can be controlled to delay the blinking drive signal VIDEO to be applied to the light source 10. As shown in FIG. 12, for example, a first to fourth blinking drive signals, named VIDEO'S 01 to 04, can be selectively generated, which are delayed for time intervals t1 to t4, respectively.

Namely, the line pattern region is moved corresponding to the delay time intervals, as shown in FIG. 11, in accordance with the first to fourth blinking drive signals, VIDEO's 01 to 04, delayed for the time intervals t1 to t4, respectively, as described above.

The line width, line space, vertical length and brightness of the line patterns and distance from the line patterns to the object have interrelationship therebetween which can be adjusted as desired through controlling of the wavelength and power of the light source, the number of facets and the rotating speed of the rotating polygonal mirror, characteristics of the cylindrical lens, and so forth.

Figure 14:
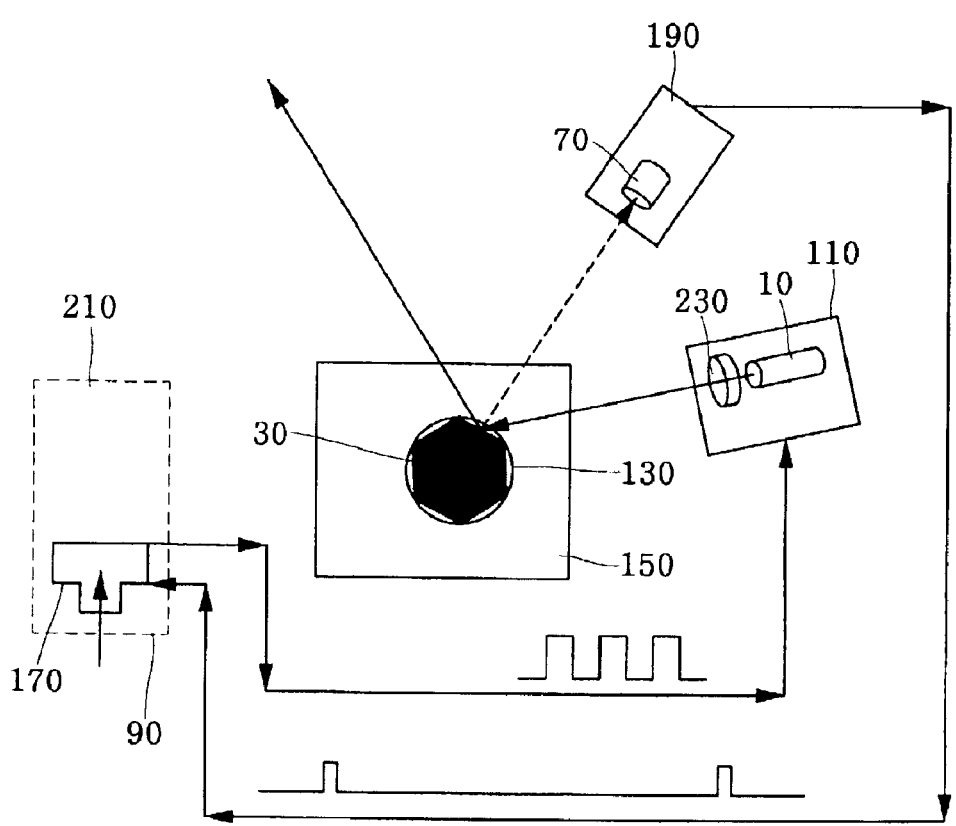
FIG. 14 is an enlarged diagram showing another laser generator of FIG. 6.

FIG. 14 is a diagram showing a different type of the laser generator, which utilizes a light source 10 integrally coupled with a condenser lens 230 so that it is not necessary to increase the diameter of a lens, which is used to transform a point light beam reflected by a reflecting facet of a rotating polygonal mirror 30 to a parallel light form, resulting in a reduced manufacturing cost and a compact size of equipment.

INDUSTRIAL APPLICABILITY

As apparent from the above description, the present invention provides a method and apparatus for measuring the three-dimensional shape of an object using a projection moiré device, which uses only a projection grid without a reference grid to measure a three-dimensional shape, thereby achieving a simple structure without inconvenience of removing an image of the reference grid from a moiré pattern having a shape information and minimizing a resulting measurement error.

The present invention further increases competitiveness of equipment through compactness of the equipment, simplicity in usage and manufacturing cost reduction, and by using a laser generator for a projection grid projector, or using a quartz glass plate having an inscribed grid for a projection grid, the present invention may adapt to variable measuring environments to improve a simplicity and reliability of a measurement.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring a three-dimensional shape of an object using a projection moiré device, comprising:

a moving table moved by a driving motor, the moving table supporting the object;

a projection grid projector for projecting a light beam from a light source onto the moving table through a projection grid, the projection grid being moved a minute distance by a driving PZT unit;

a reflection mirror for changing a light path of a light beam projected from the projection grid projector for the light beam to be reflected onto the moving table, the reflection mirror being set in the light path between the projection grid projector and the moving table;

an image obtaining unit for obtaining grid pattern images respectively projected on the object and a reference plane of the moving table, the image obtaining unit being positioned above the moving table; and a central control unit for achieving a level information of the object from the images obtained by the image obtaining unit, wherein the central control unit applies a buckets algorithm to the grid pattern images obtained through the image obtaining unit, thereby achieving an object phase of the object and a reference phase with respect to the reference plane, and subtracts the object phase from the reference phase, thereby achieving a moiré phase.

2. The apparatus as set forth in claim 1, wherein the image obtaining unit obtains the grid pattern images projected on the object and the reference plane of the moving table, respectively, through the projection grid moved a minute distance by the driving PZT unit.

3. The apparatus as set forth in claim 1, wherein the central control unit unwraps the moiré phase, thereby achieving an actual level information of the object.

4. An apparatus for measuring a three-dimensional shape of an object using a projection moiré device, comprising:

a moving table moved by a driving motor, the moving table supporting the object;

a laser generator including a rotating polygonal mirror with a plurality of reflecting facets to reflect a point light beam generated from a light source, a cylindrical lens for transforming the point light beam reflected by the rotating polygonal mirror to a parallel light beam and projecting a line pattern image on the moving table, a light receiving unit for detecting a light path reflected by the rotating polygonal mirror and thereby generating a synchronizing signal, and control means for controlling a blinking period of the light source and distances between line patterns to be adjusted in response to the synchronizing signal of the light receiving unit;

an image obtaining unit for obtaining grid pattern images respectively projected on the object and a reference plane of the moving table, the image obtaining unit being positioned above the moving table; and a central control unit for achieving a level information of the object from the images obtained by the image obtaining unit, wherein the central control unit applies a buckets algorithm to the grid pattern images obtained through the image obtaining unit, thereby achieving an object phase of the object and a reference phase with respect to the reference plane, and subtracts the object phase from the reference phase, thereby achieving a moiré phase.

5. The apparatus as set forth in claim 4, wherein the central control unit unwraps the moiré phase, thereby achieving an actual level information of the object.

6. The apparatus as set forth in claim 4, wherein the control means of the laser generator includes a light receiving unit driver coupled with the light receiving unit and a time control driver, the light receiving unit driver outputting a signal notifying the time control driver of a termination of a light beam reflection by a reflecting facet of the rotating polygonal mirror, the time control driver controlling an on/off time of a light beam outputted from the light source on the basis of the signal outputted from the light receiving unit.

7. A method for measuring a three-dimensional shape of an object using a projection moiré device, comprising the steps of:

a) obtaining a grid pattern image projected on a reference plane of a moving table, and applying a buckets algorithm thereto, thereby achieving a reference phase;

b) obtaining a grid pattern image projected on the object set on the moving table, and applying a buckets algorithm thereto, thereby achieving an object phase;

c) calculating a difference phase between the object phase and the reference phase, thereby achieving a moiré phase; and d) unwrapping the moiré phase, thereby achieving a level information of the object.

8. The method as set forth in claim 7, wherein the grid pattern image is obtained by projecting a light beam from a light source through a projection grid moved a minute distance.

9. The method as set forth in claim 7, wherein the grid pattern image is obtained by reflecting a point light beam from a light source by a reflecting facet of a rotating polygonal mirror and transforming the reflected point light beam to a parallel light beam through a cylindrical lens.

* * * * *